(12) United States Patent
Arimilli et al.

(10) Patent No.: US 6,427,204 B1
(45) Date of Patent: Jul. 30, 2002

(54) METHOD FOR JUST IN-TIME DELIVERY OF INSTRUCTIONS IN A DATA PROCESSING SYSTEM

(75) Inventors: Ravi Kumar Arimilli; Lakshminarayanan Baba Arimilli, both of Austin; John Steven Dodson, Pflugerville; Jerry Don Lewis, Round Rock, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/344,058

(22) Filed: Jun. 25, 1999

(51) Int. Cl.$^7$ ................................................ G06F 9/38
(52) U.S. Cl. ....................................... 712/206; 712/207
(58) Field of Search ................................ 712/219, 216, 712/217, 218, 23, 207, 213, 206, 214; 711/137

(56) References Cited

U.S. PATENT DOCUMENTS

| | | | |
|---|---|---|---|
| 5,214,765 A | | 5/1993 | Jensen |
| 5,278,985 A | | 1/1994 | Odnert et al. |
| 5,307,477 A | | 4/1994 | Taylor et al. |
| 5,404,484 A | | 4/1995 | Schlansker et al. |
| 5,694,574 A | | 12/1997 | Abramson et al. |
| 5,717,882 A | * | 2/1998 | Abramson ................... 712/217 |
| 5,737,565 A | | 4/1998 | Mayfield |
| 5,758,051 A | | 5/1998 | Moreno et al. |
| 5,761,515 A | | 6/1998 | Barton et al. |
| 5,809,275 A | * | 9/1998 | Lesartre ....................... 712/216 |
| 5,895,495 A | | 4/1999 | Arimilli et al. |
| 5,964,867 A | * | 10/1999 | Anderson .................... 712/219 |
| 5,987,594 A | * | 11/1999 | Panwar ......................... 712/216 |
| 5,999,727 A | | 12/1999 | Panwar et al. |
| 6,006,326 A | | 12/1999 | Panwar et al. |
| 6,052,775 A | | 4/2000 | Panwar et al. |
| 6,058,472 A | | 5/2000 | Panwar et al. |
| 6,065,101 A | | 5/2000 | Gilda |
| 6,092,180 A | | 7/2000 | Anderson et al. |
| 6,145,059 A | | 11/2000 | Arimilli et al. |

OTHER PUBLICATIONS

U.S. application No. 09/344,023, Arimilli et al., filed Jun. 25, 1999.
U.S. application No. 09/344,060, Arimilli et al., filed Jun. 25, 1999.
U.S. application No. 09/338,946, Arimilli et al., filed Jun. 25, 1999.
U.S. application No. 09/344,057, Arimilli et al., filed Jun. 25, 1999.
U.S. application No. 09/344,061, Arimilli et al., filed Jun. 25, 1999.

* cited by examiner

Primary Examiner—Eric Coleman
(74) Attorney, Agent, or Firm—Casimer K. Salys; Bracewell & Patterson, L.L.P.

(57) ABSTRACT

A system for time-ordered issuance of instruction fetch requests (IFR). More specifically, the system enables just-in-time delivery of instructions requested by an IFR. The system consists of a processor, an L1 instruction cache with corresponding L1 cache controller, and an instruction processor. The instruction processor manipulates an architected time dependency field of an IFR to create a Time of Dependency (ToD) field. The ToD field holds a time dependency value which is utilized to order the IFR in a Relative Time-Ordered Queue (RTOQ) of the L1 cache controller. The IFR is issued from RTOQ to the L1 instruction cache so that the requested instruction is fetched from the L1 instruction cache at the time specified by the ToD value. In an alternate embodiment the ToD is converted to a CoD and the instruction is fetched from a lower level cache at the CoD value.

21 Claims, 6 Drawing Sheets

METHOD FOR JUST IN-TIME DELIVERY OF INSTRUCTIONS IN A DATA PROCESSING SYSTEM

The present invention is related to the subject matter of the following commonly assigned, copending U.S. patent applications Ser. No. 09/344,023 entitled "Processor and Method for Just-in-Time Delivery of Load Data Via Time Dependency Field" and filed Jun. 25, 1999; Ser. No. 09/344,061 entitled "Method for Just-In-Time Delivery of Load Data Via Cycle of Dependency" and filed Jun. 25, 1999; Ser. No. 09/344,057 entitled "Method for Just-In-Time Delivery of Load Data by Intervening Caches" and filed Jun. 25, 1999; Ser. No. 09/344,059 entitled "Method for Alternate Preferred Time Delivery of Load Data" and filed Jun. 25, 1999; Ser. No. 09/338,946 entitled "Method for Just-in-Time Delivery of Load Data Utilizing Alternating Time Intervals" and filed Jun. 25, 1999; and Ser. No. 09/344,060 entitled "Acknowledgement Mechanism for Just-in-Time Delivery of Load Data" and filed Jun. 25, 1999. The content of the above-referenced applications is incorporated herein by reference.

BACKGROUND OF THE INVENTION

1. Technical Field

The present invention relates in general to instruction processing systems and in particular to a method and system for ordering instruction fetch requests. Still more particularly, the present invention relates to a method and system for implementing just-in-time delivery of instructions requested by instruction fetch request.

2. Description of the Related Art

In conventional symmetric multiprocessor (SMP) data processing systems, all of the processors are generally identical. The processors all utilize common instruction sets and communication protocols, have similar hardware architectures, and are generally provided with similar memory hierarchies. For example, a conventional SMP data processing system may comprise a system memory, a plurality of processing elements that each include a processor and one or more levels of cache memory and a system bus coupling the processing elements to each other and to the system memory.

Conventional SMP data processing system processors have a number of execution units. Superscalar multiprocessors typically have more than one of each execution unit. They typically have two floating point units (FPUs), two fixed point units (FXUs) and two load/store units (LSUs). The processors are designed for high frequency and their corresponding internal caches are typically very small in order to operate with the high frequency processor. In part due to their relatively small size, these internal caches sustain a large number of cache misses during requests for instruction. Instructions are thus stored in lower level (L2) caches to maximize processing speed. The processors typically send multiple instruction fetch requests simultaneously or within close proximity to each other. This is particularly true in multithreaded or superscalar processors with multiple IFUs.

Traditionally, processors execute program instructions in order. With state-of-the-art processors, out-of-order execution of instructions is often employed to maximize the utilization of execution unit resources within the processor, thereby enhancing overall processor efficiency. Further, in these state-of-the-art processors that support out-of-order execution of instructions, instructions may be dispatched out of program order, executed opportunistically within the execution units of the processor, and completed in program order. The performance enhancement resulting from out-of-order execution is maximized when implemented within a superscalar processor having multiple execution units capable of executing multiple instructions concurrently.

Instructions are typically stored according to program order in a cache line within an instruction cache (I-cache) of a processor. Furthermore, each unit of access to the I-cache is generally more than one instruction. For example, for a processor architecture that has a four-byte instruction length, each I-cache access may be 32 bytes wide, which equals to a total of eight instructions per I-cache access. Even with the simplest I-cache design, these instructions must be multiplexed into an instruction buffer having eight or less slots, before sending to the issue queue.

During fetching of instructions all eight instructions are initially read from the I-cache. The fetch address of the first instruction is then utilized to control an 8-to-1 multiplexor to gate the first four instructions into an instruction buffer with, for example, four slots. The fetch address is also utilized to select a target instruction along with the next three instructions from the eight instructions, to gate into the instruction buffer. All four instructions are gated into the instruction buffer in execution order instead of program order. With this arrangement, when the fetch address is the result of a (predicted or actual) branch instruction, the first instruction to be gated into the instruction buffer may be any one of the eight instructions. The target address of the branch instruction may point to the last instruction of the I-cache access and then not all four slots within the instruction buffer will be completely filled.

Branch processing for example, results in a delay in processing particularly when the branch is speculative and is guessed incorrectly. The branch instruction and subsequent instructions from instruction path taken utilizes the cache resources which have to be re-charged when the path is incorrectly predicted. This results in a loss of many clock cycles and leads to less efficient overall processing.

Processors today often run numerous cycles ahead of the instruction stream of the program being executed. Also, on these processors, instruction fetch requests are issued as early as possible in order to "hide" the cache access latencies and thus allow ensuing dependent instructions to execute with minimal delay. These techniques lead to requests for instructions which may not be required immediately. Also, this often leads to bubbles in the pipeline of instructions. Finally, an L2 cache has a limited amount of wired connections for returning instructions. When an instruction is sent prior to the time it is required, it utilizes valuable wired cache line resources which may be required for more immediate or important instructions.

In the prior art instruction fetch requests may be issued out of order. Often times this results in an instruction queue occupying valuable cache line resources or register space for many cycles before it is utilized by the program. When a large number of instruction fetch requests are present, this results in loading down the critical cache and queue resources resulting in less efficient processing.

When the instruction cache is "bombarded" with instruction fetch requests, no ordering information is included. The instruction cache is oblivious as to which load instruction to process and in which order. In traditional processors, ordering information is typically implied based on a "First Come First Serve" prioritization scheme. However, in some cases an instruction is often not required by the processor or program at the time or in the order it is requested.

Thus many hardware and software limitations exist in the current method of fetching instructions from an instruction cache. It is obvious that a more efficient means of fetching instructions from an instruction cache needs to be developed. A processor should be able to issue its fetch requests so that the instruction cache can more optimally deliver the instruction only when it is actually required, while preventing bubbles in the pipeline.

It would therefore be desirable to provide a method and system for improving the efficiency of instruction fetch request processing and subsequent fetching of instructions. It is further desirable to provide a method and system which allows for just-in-time delivery and/or time-ordered delivery of instructions during execution of an instruction set thus allowing instructions to be fetched from an instruction cache at the time when needed within the program execution stream.

SUMMARY OF THE INVENTION

It is therefore one object of the present invention to provide an improved instruction processing system.

It is another object of the present invention to provide an improved method and system for efficiently managing multiple instruction fetch requests to an instruction cache, It is yet another object of the present invention to provide a method and system for implementing just-in-time delivery of instruction requested by instruction fetches.

The foregoing objects are achieved as is now described. A system for time-ordered issuance of instruction fetch requests (IFR) is disclosed. More specifically, the system enables just-in-time delivery of instructions requested by an IFR. The system consists of a processor, an L1 instruction cache with corresponding L1 cache controller, and an instruction processor. The instruction processor manipulates an architected time dependency field of an IFR to create a Time of Dependency (ToD) field. The ToD field holds a time dependency value which is utilized to order the IFRs in a Relative Time-Ordered Queue (RTOQ) of the L1 cache controller. The IFR is issued from RTOQ to the L1 instruction cache so that the requested instruction is fetched from the L1 instruction cache at the time specified by the ToD value. In an alternate embodiment the ToD is converted to a CoD and the instruction is fetched from a lower level cache at the CoD value.

The above as well as additional objects, features, and advantages of an illustrative embodiment will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
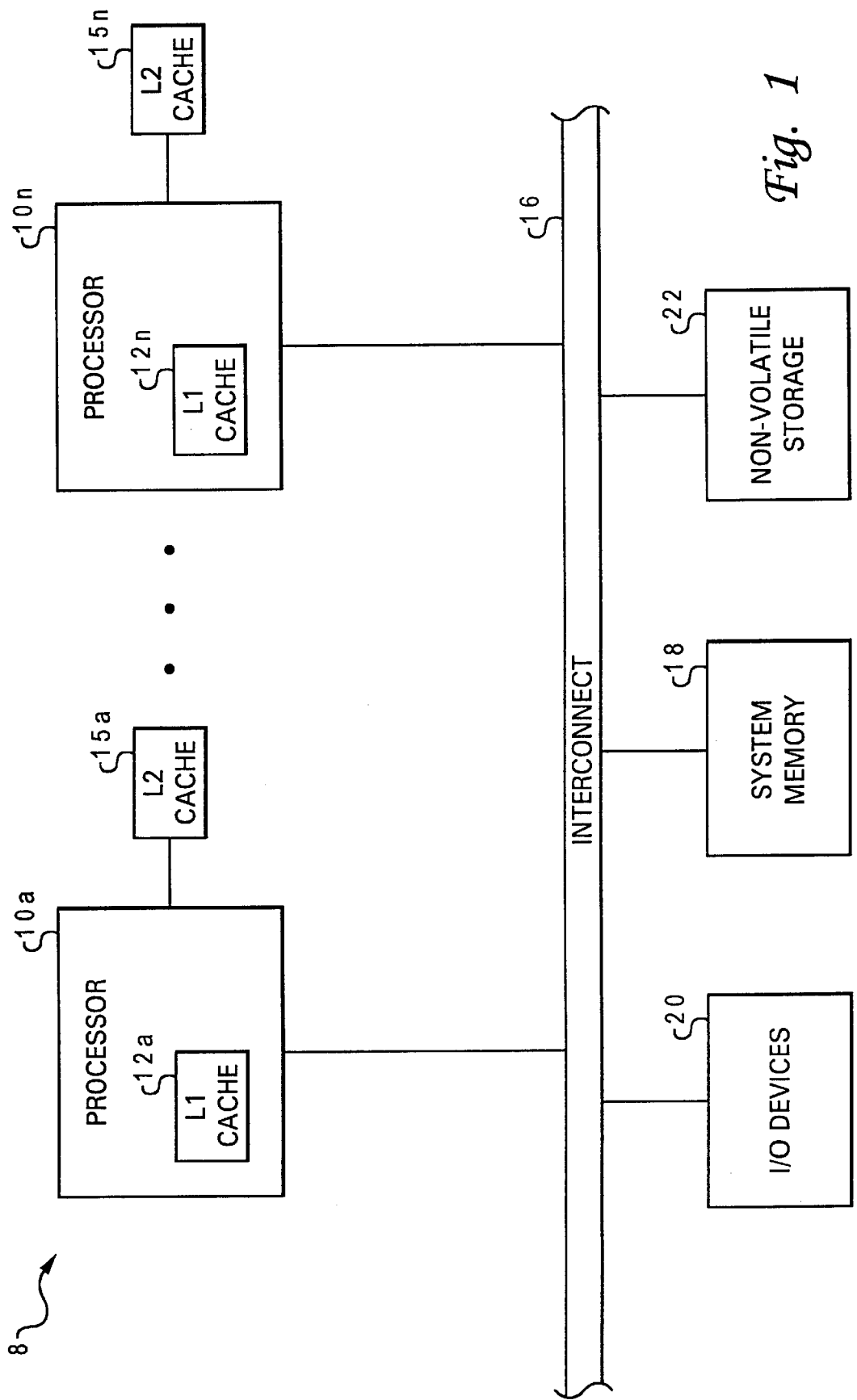
FIG. 1 depicts a high level block diagram of a multiprocessor instruction processing system in accordance with the present invention.

With reference now to the figures, and in particular with reference to FIG. 1, there is illustrated a high level block diagram of a multiprocessor instruction processing system in accordance with the present invention. As depicted, instruction processing system 8 includes a number of processors 10a–10n. Processors 10a–10n preferably comprises one of the PowerPC™ line of microprocessors available from International Business Machines Corporation; and are superscalar with full out-of-order execution. Those skilled in the art will appreciate that other suitable processors can be utilized. In addition to the conventional registers, instruction flow logic and execution units utilized to execute program instructions, each of processors 10a–10n also include an associated on-board level one (L1) instruction caches 12a–12n, which temporarily holds instructions that are likely to be accessed by the associated processor.

In order to minimize latency, instruction processing system 8 may also include one or more additional lower levels of cache, such as level two (L2) caches 15a–15n. L2 caches 15a–15n are depicted as off-chip although it is conceivable that they may be on-chip with L1 caches 12a–12n. Also, the L2 caches 15a–15n could be traditional inline or lookaside w.r.t. the interconnect, as well as inclusive or non-inclusive of their respective L1 caches 12a–12n. L2 caches 15a–15n can typically store a much larger number of instructions than L1 caches 12a–12n, but with a longer access latency. For example, L2 caches 15a–15n may have a storage capacity of 4 M-bytes and an access latency of 20 cycles, while L1 caches 12a–12n may have a storage capacity of 32 kilobytes with an access latency of 2 cycles.

As illustrated, instruction processing system 8 further includes input/output (I/O) devices 20, system memory 18, and non-volatile storage 22, which are each coupled to interconnect 16. I/O devices 20 comprise conventional peripheral devices, such as a display device, keyboard, and graphical pointer, which are interfaced to interconnect 16 via conventional adapters. Non-volatile storage 22 stores an operating system and other software, which are loaded into volatile system memory 18 in response to instruction processing system 8 being powered on. Of course, those skilled in the art will appreciate that instruction processing system 8 can include many additional components which are not shown in FIG. 1, such as serial and parallel ports for connection to network or attached devices, a memory controller that regulates access to system memory 18, etc.

Interconnect (system bus) 16, which can comprise one or more buses or a cross-point switch, serves as a conduit for communication transactions between processors 10a–10n, system memory 18, I/O devices 20, and nonvolatile storage 22. A typical communication transaction on interconnect 16 includes a source tag indicating the source of the transaction, a destination tag specifying the intended recipient of the transaction, an address, and instruction. Each device coupled to interconnect 16 preferably snoops all communication transactions on interconnect 16.

The execution circuitry of processors 10a–10n each comprises multiple execution units, including two fixed-point units (FXU), two load/store units (LSU), and two floating-point units (FPU). As is well-known to those skilled in the computer art, each of the execution units typically executes one or more instructions of a particular type of instructions during each processor cycle.

Processor 10 employs both pipelining and fully out-of-order execution of instructions to further improve the performance of its superscalar micro-architecture. Accordingly, instructions are typically requested by instruction fetching unit (IFU) in any order to keep the processor from stalling (i.e., keep the pipeline flowing).

As its name implies, IFU typically issues instruction fetch requests (IFR) from L1 cache or memory (i.e., either L2 cache 15a . . . 15n or main memory). The present invention extends the functionality of the IFU during fetching of instructions to allow just-in-time delivery of instructions as will be described below.

Instruction fetcher fetches instructions from instruction cache and loads such instructions into instruction queue. Instruction queue holds several instructions loaded by instruction fetcher. Instruction fetcher continuously loads instructions to keep the space in instruction queue filled. Instructions are dispatched to their respective execution units from dispatch unit.

Although the invention is being described with reference to the above mentioned data processing systems, these references are in no way meant to be limiting on the invention. Other system types and architecture may be utilized in implementing the invention. For example, although FIG. 1 depicts only two levels of cache, the memory hierarchy of instruction processing system could be expanded to include additional levels (L3, L4, etc.) of serially-connected caches. Finally, other embodiments may provide that any level cache consist of a single cache, for example, a single L2 cache may be utilized within the instruction processing system and accessible to a number (cluster) of the processors simultaneously. This latter embodiment is presented in FIG. 3 which follows. A simple L1 internal and L2 external cache topography is utilized in the illustrations for simplicity.

The preferred embodiment of the present invention appends a time dependency field (TDF) (i.e., a time order field) to IFR. The TDF is a set of bits which is populated with information which establishes on which cycle to fetch instruction requested by the IFR, (i.e., when to send the IFR to L1 or L2 instruction cache to effectuate delivery of instruction at a desired time.) In the preferred embodiment, this is referred to as "just-in-time" delivery of instruction. The processor launches IFRs and sends the time order information with the instruction regarding when the instruction is needed by the process (for example, at 50th cycle). In the preferred embodiment, this bit field acts as a hint only and depends on the availability of system resources, and other factors. Also, in the preferred embodiment the TDF field is dynamically created by hardware during instruction processing.

Another embodiment of the invention is implemented with multiple TDFs appended to the IFRs as will be discussed below.

Those skilled in the art understand that any number of TDFs with differing functionalities may be utilized within the scope of the invention, and that the number of fields actually presented herein are done so for illustrative purposes only. The configuration of these TDFs with respect to a regular IFR is illustrated in FIG. 2.

Figure 2:
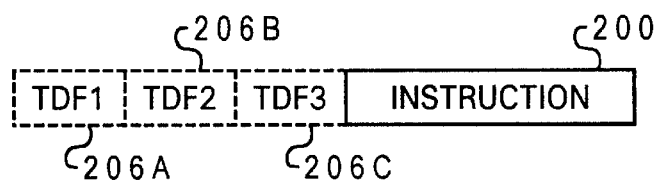
FIG. 2 is a block diagram of a instruction fetch request (IFR) with appended time dependency field (TDF) in accordance with a preferred embodiment of the present invention.

FIG. 2 depicts an IFR 200. Also, depicted are first TDF 206A, second TDF 206B, and third TDF 206C (collectively referred to hereinafter as TDF 206 unless specifically named or excluded) appended according to the preferred embodiment of the invention. For simplification, discussions of the invention will focus on the first TDF 206A which is utilized as the CoD field in the preferred embodiment. Second TDF 206B utilized as secondary dependency (SD) and third TDF 206C utilized as a range of dependency (RoD) will be discussed in detail in the section titled "Multiple TDF Method" below. TDF 206 holds a time value utilized to order the IFR in a time-ordered queue of an instruction cache controller. The IFR 200 is then sent to the instruction cache at a particular time to allow the instruction to be loaded at the time specified in TDF 206. Presently not all the fields are present in industry standard architecture (ISA). The dotted lines in FIG. 2 indicates that TDF 206 may or may not be present depending on the ISA of the processor. However, the inventors envision a new ISA which allows a set of bits to be specifically identified as a TDF 206. This new ISA includes an Architected TDF (ATDF) which is created by the compiler. Another embodiment utilizes currently available bits in ISA which are redefined to be utilized as the ATDF. The ATDFs contain general dependency information provided during compilation of the instructions. ATDF (TDF 206) are later provided program specific dependency information and converted to an Internal TDF (ITDF) via one of two methods discussed with reference to FIG. 4. Internal TDF (ITDF) (or Relative Time Ordered (ToD) field, secondary dependency field, and range of dependency field) is dynamically created during instruction processing. In multiple TDF embodiments equivalent number of ITDFs are created and include DoD field, secondary dependency (SD) and range of dependency (RoD) field.

The ITDF contains either Relative Time of Dependency (ToD) or Cycle of Dependency (CoD) information. ToD refers to a relative time (number of cycles) between issuing the IFR and the instruction (for example, in 15 cycles). CoD refers to an absolute time based on a Dependency Synchronized Timer (DST) (for example, at cycle 252). DST is basically a timer within the processor which is synchronized with the DST of the other system components which utilize just-in-time instruction delivery techniques. For illustrative purposes, it is assumed that a DST runs for 512 cycles (9 bit clock) each period. An IFR with ToD of 100 cycles is issued in time for the instruction to arrive to the execution unit on/immediately after 100 cycles, irrespective of the DST. However, an IFR with CoD value of 100 when the DST clock is at 75 would issue the load request in time for the instruction to arrive on/immediately after 25 cycles (100–75). The various differences in utilization and terminology will become more apparent with reference to FIG. 4.

The preferred embodiment of the invention allows for the storage of an "absolute" time in the CoD field corresponding to the DST time the instruction is actually provided to the execution units. In another embodiment the CoD corresponds to DST time the instruction is actually requested from the L2 cache. Depending on the availability of system resources, the desired absolute time may or may not be available and an "imprecise" time (within a range of cycles from the exact time, will be assigned to the IFR as will become clear with the description of FIG. 4 and FIG. 7. The utilization of ToD and CoD with IFRs leads to "just-in-time" or time ordered instruction delivery.

In the preferred embodiment, the time required for instruction to travel from the instruction cache to the requesting process is utilized as an offset to the ToD time and subsequent CoD time (also the RD and SD time). This offset allows the IFR to be issued to the instruction cache at a time which results in the instruction arriving at the execution unit at the desired time. The offset may be utilized within the calculation of original ToD value or utilized by the time ordered queue to offset each value during a snoop or search. Alternatively, the time ordered queue may be designed with a delay equal to the offset.

The preferred embodiment of invention stores "relative" times in the ToD field. Relative time is based on an analysis of all the IFRs and their corresponding instructions. The IFRs are received by L1 cache during program execution either simultaneously or in program order. The L1 cache reschedules them for execution based on their respective ToD fields, thus optimizing the L1 cache resources, and keeping the pipeline of instructions flowing.

In the preferred embodiment, one of two dynamic hardware implementations is utilized for appending the priority field. The first preferred implementation appends the ToD functionality during the "processing" of instructions in an instruction processor located within the processor of the instruction processing system. The second embodiment is based on an re-configured or newly designed ISA which supports having a TDF appended to regular IFRs as described above. For both embodiments, the actual ToD information is placed in the ToD field (the new ITDF) by a dependency component/logic within (or external to) the instruction processor.

Figure 4:
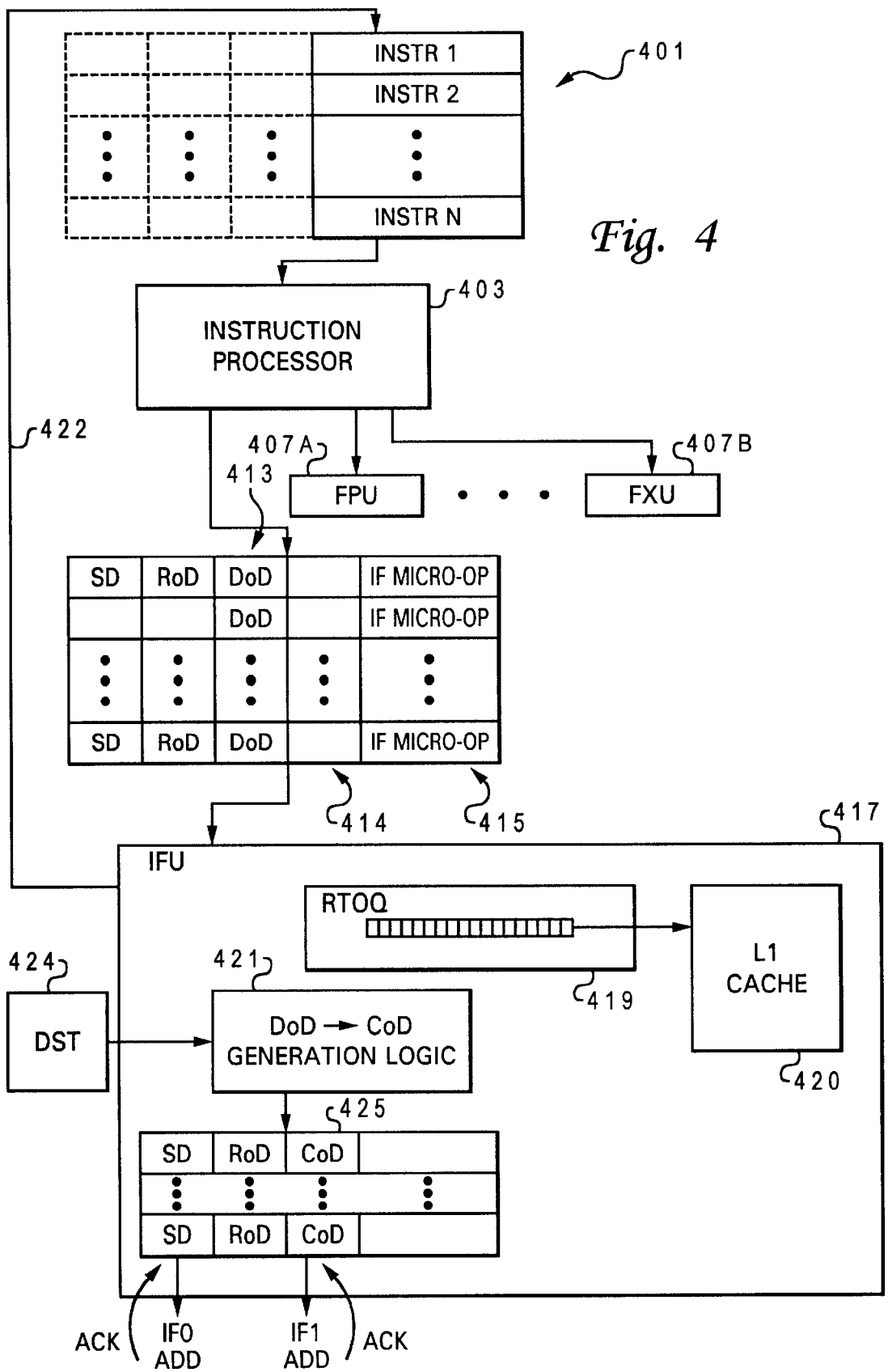
FIG. 4 is a block diagram illustrating the creational steps of a IFR with appended TDF and subsequent utilization of the TDF within the processor and cache in accordance with one embodiment of the present invention.

Turning now to FIG. 4, there is depicted a logical view of a dynamic hardware implementation of appending (if necessary) and/or setting the TDF and subsequent utilization of the value in that field to order IFRs from within L1 cache controller. An architected instruction stream 401 (such as X86, PowerPC, etc.) comprising of IFRs of FIG. 2 and other instruction types is sent through an instruction processor 403 where the instructions are processed and converted into hardware specific instructions. Instruction processor 403 typically reformats, cracks, combines and reschedules the architected instructions based on the processor design. Those skilled in the art are familiar with an instruction processor which takes as input numerous architected instructions and produces an output stream of micro-instructions which are specific to the underlying hardware. For example, three 32 bit architected instruction may yield five 19 bit micro-instructions (micro-ops). These unique micro-instructions include IFR micro-instructions 415 and other types of micro-instructions (now shown). In the illustrative embodiment, micro-ops are separated into IFR micro-ops 415 and other types of micro-ops. The other types of micro-ops are sent to their respective execution units including FPU 407A and FXU 407B. IFR micro-ops 415 with their appended ToD field are sent to IFU 417. The present invention is concerned only with the novel methods of utilizing an instruction processor 403 to determine a ToD and placing that ToD in a TDF field which may be either architected by the ISA or created within the instruction processor 403. Creating hardware specific micro-ops is known in the art.

The appended IFRs which were originally in program execution order are given a ToD field 413 and other fields 414 utilized during processing. Those skilled in the art are familiar with these other fields 414 and processes by which these other fields 414 are appended. The value within ToD field 413 is utilized within IFU 417 to determine "when" to load requested instruction for each IFR micro-op 415. IFR micro-ops 415 are then sent to IFU 417 where they are scheduled within the relative time-ordered queue (RTOQ) 419 of L1 cache controller (not shown). When a load request is triggered by the processor, the L1 cache controller determines if the instruction is available in L1 cache 420 (i.e. a hit). If the instruction is available, then the load request is sent to RTOQ 419 which holds the IFR until the time distance specified (i.e. # of cycles) in ToD field 413.

The ToD functionality assumes a non-blocking fixed-delay path from the instruction processor 403 to IFU 417 to respective dependent IFR (i.e., a known and invariant number of cycles for transmission of the load micro-op 415 from the instruction processor 403 to IFU 417). This guarantees the correct reference cycles for TOD.

When a hit occurs at L1 cache 12 and the RTOQ 419 is able to schedule the instruction micro-op 415 at the cycle requested, an acknowledgement (ACK) signal 422 is sent to the instruction processor which utilizes this information during future ordering (or ToD evaluation) of instructions. The functionality of the ACK is described in greater detail below. ToD appended instructions (instruction micro-op 415) are placed in the instruction stream 401 for processing.

In the event that a miss occurs, IFU 417 then the request for the instruction is sent to L2 cache (not shown). This invention implements a series of processes to convert ToD field 413 to a CoD field 425 for utilization by external components such as the L2 cache and memory. This conversion process is necessary to implement a time ordered mechanism at the general system level. The time of propagation of the IFR on the system bus as it searches the external components is not readily ascertainable. It is dependent on system loading, availability of the system bus, etc. These various factors makes it impossible to determine a "relative" time for the IFR to be sent to the external component to retrieve the instruction. (Also, for the same reasons, it is difficult to ascertain when the instruction will actually arrive at the processor.) Thus DST 422 is utilized to synchronize the system components. DST 422 then becomes a reliable reference by which the IFR may be dispatched at the correct cycle within the external components. The DST time for fetching the requested instruction is represented as a CoD. ToD to CoD conversion generation logic 421 is utilized with an input from DST 422 to create a IFR 423 with appended CoD field 425 as described below.

In the preferred embodiment, the processing of ToD to CoD generation logic 421 requires DST 422 and a non-conventional adder (described with reference to FIG. 5 below) which performs a "X" bit to "X bit + even/odd bit" addition. The process may be completed with a conventional adder which for example, takes a 40 bit clock and adds it to a 9 bit ToD field to create a very large 40 bit cycle output. This approach, however, requires significant amounts of hardware to implement. Additionally, with this approach, the clock would not be able to handle carry overs and would require suspending the setting of CoD fields for clock cycles close to the end of the period, thus requiring even more logic and hardware to implement.

Figure 6:
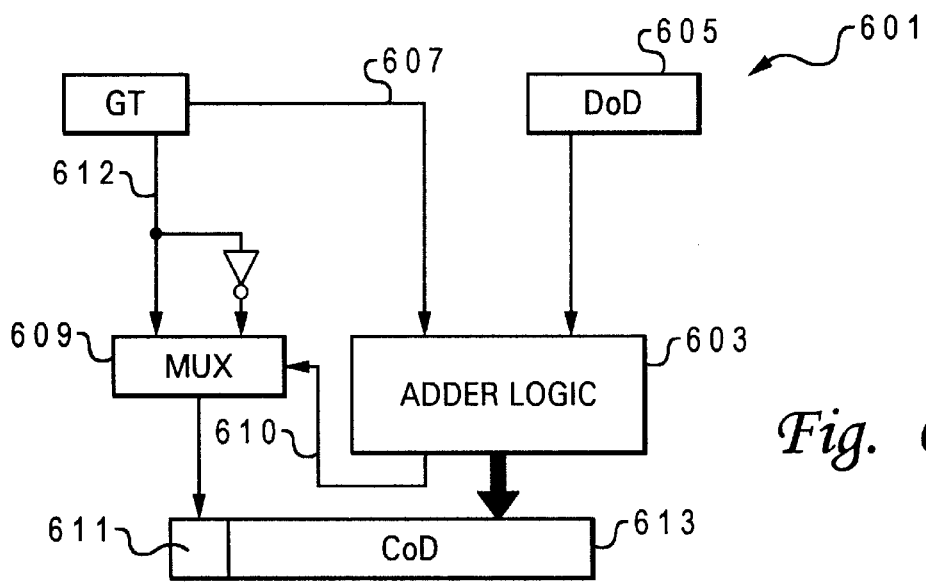
FIG. 6 depicts an adder component logic for converting a Time of Dependency (ToD) field to a Cycle of Dependency (CoD) field in accordance with a preferred embodiment of the present invention.

The preferred embodiment of the invention utilizes the non-conventional adder functionality to append a bit which indicates whether a load request is on an odd or even cycle. FIG. 6 illustrates the adder 601 comprised of adder logic 603 with a first input 605 being the ToD value and a second input 607 being the (9 bit) DST value. An additional logic structure (MUX) 609 has as inputs the DST current status 612 (i.e. even or odd) and the carry over value 610 of the adder logic 603. MUX 609 determines whether the time is in an even or odd cycle and stores the answer in even/odd bit 611 of CoD field 613. If there is a carry over value 610, then MUX 609 changes the value of the DST current status 612. In this embodiment, CoD field 613 always consist of one additional bit than ToD field. only the CoD field is shown in this embodiment, however it is understood that this field is appended to a IFR.

In an illustrative example, assume that a DST goes through 512 cycles each period (i.e., a 9 bit clock) and that the maximum CoD for any IFR is 500 cycles (i.e., also a 9 bit CoD field). If a IFR with a ToD value of 300 cycles is received as an input to the adder along with a DST time of 280, then the IFR is delivered on cycle 68 of the next DST period. The DST time 68 is stored within the 9 bits of CoD. However, this absolute time refers to the next time period, otherwise the dynamic time ordering queue (discussed in FIG. 3 below) becomes confused about where in the queue to place the IFR. Several different implementations of resolving this uncertainty, not previously known in the art, will become clear to those skilled in the art in light of the above stated disclosure herein.

In the preferred embodiment, the DST is assumed to be alternating between even and odd time periods. For illustrative purposes, an even period is represented by a value of 1 and an odd period is represented by a value of 0. The adder appends the odd/even bit with its respective value, determined based on whether or not there is a carry over during the known (i.e. even or odd) DST period.

In yet another embodiment, the DST is always assumed to be even (or odd) for the present cycle and all IFRs for that cycle are given the respective bit, say 0. When the DST period rolls over, all IFR still left are assumed to be on the current cycle and their even/odd bit changed to 0. The newly added instructions which have a carry over are stored with a 1 even/odd bit and those without a carry over are given a 0 even/odd bit.

The embodiments presented herein assume that the ToD field holds a value which is less than the DST period; however, those skilled in the art will understand that the various functionalities of the invention may be implemented with ToD values larger than the DST cycle. In such a case, additional logic must be included to allow for the ToD and CoD value to be derived at some distant DST period.

For illustrative purposes, it is assumed that the non-architected micro-ops include only 19 bits. Assuming further that the TDF field is made up of 9 bits, then the resulting ToD IFR micro-ops are 28 bits and the corresponding CoD IFR micro-ops are 29 bits. The preferred embodiment is implemented on a instruction processing system in which the hardware components, the processor, the LSU and L1 and L2 cache, and bus connectors, etc. are designed to recognize a 29 (or 28) bit micro-op (i.e. the extra 9 bits of ToD and/or 10 bits of CoD) and execute the IFRs with these additional bits appended.

Figure 3B:
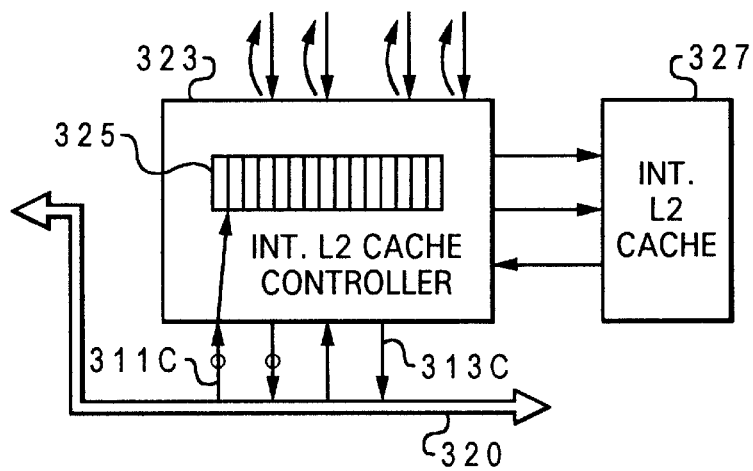
FIG. 3B depicts a block diagram of an intervening L2 cache in accordance with one embodiment of the present invention.
Figure 3A:
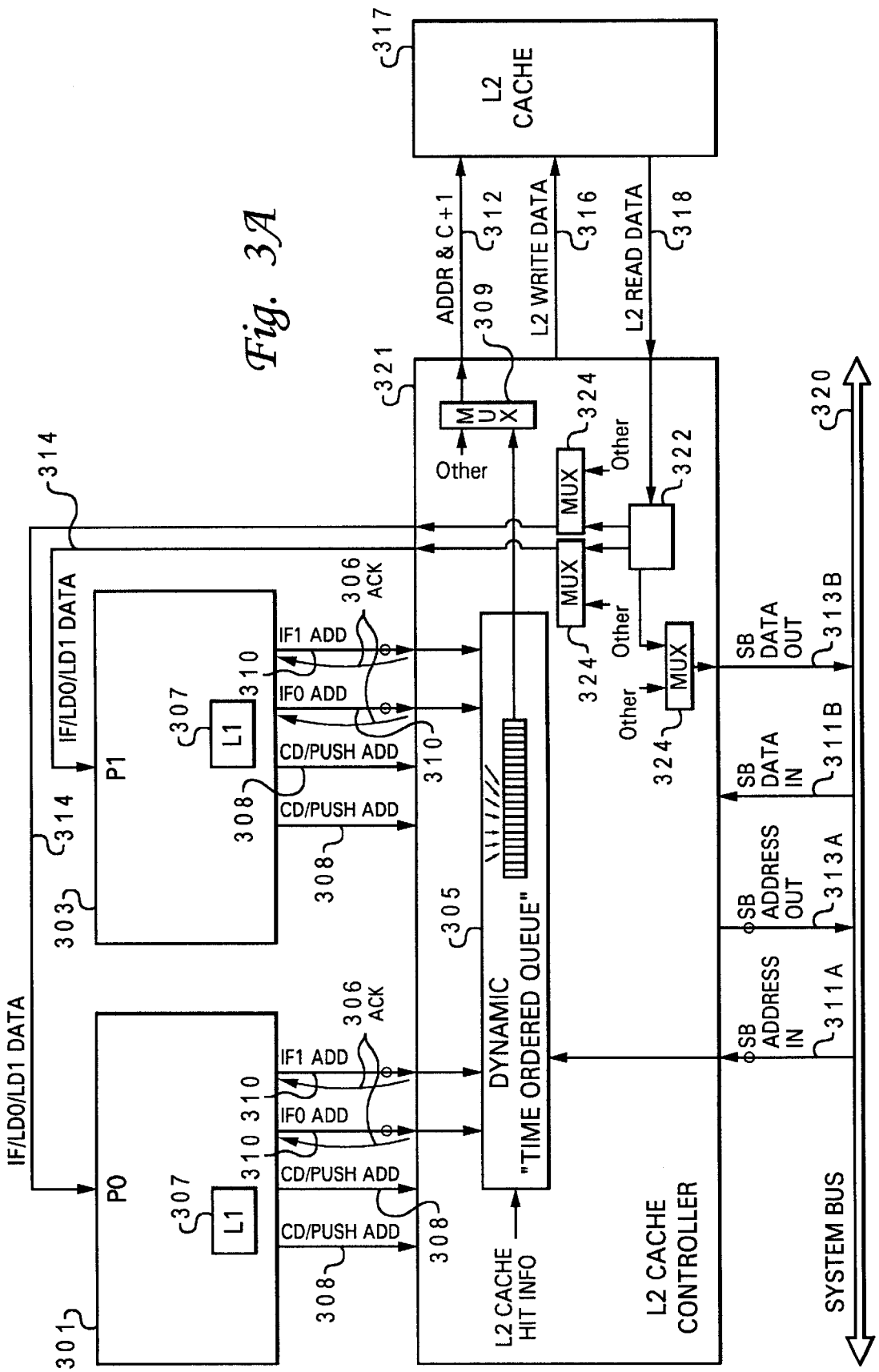
FIG. 3A depicts a detailed block diagram of an instruction fetching unit (IFU) unit of a processor coupled to an L2 cache controller and L2 cache utilized to implement the preferred embodiment of the present invention.

With reference now to FIG. 3A. FIG. 3A depicts multi-processor access to a lower level instruction (L2) cache. Processor 301 and Processor 303 (collectively referred to as processors) both access a single L2 cache 317. Both processors 301 and 303 contain at least one IFU 307 and are connected to L2 cache 321 via a series of outgoing interconnects (buses) which include cast out/push address bus 308 and IFR address bus 310, and a series of incoming interconnects which include IFR invalidates bus 314 and acknowledgement bus 306. Interconnects for IFR address 310 contain the IFR being sent to L2 cache. IFR address 310 has an appended cycle of dependency (CoD) field which will be discussed in detail below. Return bus 314 also connects L2 cache 317 to processors 301 and 303. Instruction buses collectively are utilized for transmitting IFRs and corresponding instructions to and from L2 cache 317. L2 cache controller 321 contains a directory (not shown) and a dynamic "Time-Ordered Queue" (DTOQ) 305 which orders IFR and other requests for instruction from L2 cache 317. L2 cache controller 321 also contains various logic structures 309, 322 and 324 utilized during fetch and receive stages of instruction requests. IFRs from IFU 307 are sent as address 310 to L2 cache controller 321. L2 cache controller checks its directory structure to determine if the result of the request is a "hit" or "miss." If it is a hit (i.e. instruction is present in L2 cache), then IFR address 310 is sent to DTOQ 305 to reserve a queue position for delivery of the instruction. DTOQ 305 orders IFR address 310 according to its CoD and transmits IFR address 310 at the precise time requested per its CoD to L2 cache 317. L2 cache 317 is gated by a MUX 309 which accepts IFR address 310 and other simultaneous requests to L2 cache 317. During time-ordered queuing, when the IFR address 310 is placed in the queue, (i.e., the requested cycle for delivery of instruction is available, an acknowledgement (ACK) 306 is transmitted back to the processors 301 and 303.

FIG. 3A also depicts system bus (SB) 320 which provides an interconnect between L2 cache controller 321 and other system components (not shown). System bus (SB) 320 has outgoing interconnects 311 including SB address in bus 311A and SB instruction in bus 311B which snoops L2 cache 217 via L2 cache controller 321. SB 320 also has incoming interconnects, SB address out bus 313A and SB instruction out bus 313B. Requests for instruction from L2 cache 317 are sent to L2 cache controller 321 via SB address in bus 311A. In the illustrative embodiment, SB address in bus 311A also contains a CoD field utilized for ordering its request in dynamic time ordering queue 305.

L2 cache 317 receives IFRs 312 as input. Once a IFR 312 is received at L2 cache 317, corresponding instruction is immediately located via address information as is known in the art, and outputted via L2 read instruction 314. L2 read instruction 318 is passed through a first logic structure 322 which determines where to deliver the instruction. Then L2 read instruction 318 passes through MUX 324 shown with other inputs. Instruction requested by L1 is sent to processors 301 and 303 via return buses 314. Instruction requested by external components connected to system bus 320 are sent to external components via SB instruction out 313B.

L2 cache 317 transmits an ACK signal 306 back to processors 301 and 303. An ACK signal 306 is sent only when IFR provides a hit and can be scheduled for the requested cycle. If a hit occurs but there is a conflict with the desired time requested (for example, another IFR has already been allotted the time slot), no ACK is sent. ACK signal 306 may be a packet, a 1 bit pulse, or any other means utilizing minimal system resources by which L1 cache is made aware of the availability of the requested time slot for delivery of the instruction (i.e., the instruction will be delivered at the cycle specified in the CoD field.). ACK signal 306 allows the arbiters and other resources within the processor to more opportunistically prepare for delivery of instructions. ACK signal as utilized herein provides level information to allow the scheduler or processor to re-optimize based on the availability of lower level resources. ACK signal 306, once received, indicates to the processor that it may reserve its pipeline and other resources to that instruction at the time specified within its CoD field.

If no acknowledgement is received, processors 301 and 303 have to predict possible return path and reserves bubbles in pipeline for when it expects the instruction. This involves an associative compare process with other instructions to determine where instruction belongs. An incorrect prediction results in bubbles in the pipeline and less efficient processing.

Another embodiment of the invention occurs when there is an L2 miss (i.e., requested instruction is not in L2 cache). FIG. 3B depicts an intervening cache 327 with similar configuration as the cache of FIG. 3A. Often, instruction requested may be in another location, either in memory or another parallel L2 cache (intervening cache) 327 coupled to another processor. The IFR address is sent via SB address out bus 313A and system bus 320 to other caches. SB address out 313A contains the IFR which includes the appended CoD field. This request is sent via system bus to intervening cache 327 which snoops the request and represents the input of SB address in bus 311C of this structure. The same process of ordering the IFRs utilizing the CoD field occurs within intervening cache 327 utilizing intervening cache controller 323 and intervening cache DTOQ 325. When a hit occurs, however, the instruction is sent back to processors 301 and 303 via SB instruction out bus 313C and SB 320 and received at SB instruction in bus 311B.

It is expected that various other system components, such as memory, may contain a dynamic time-ordered queue and that such configurations are covered within the scope of this invention. This allows for a system architecture which time orders all requests for information within the system. The system's bus therefore becomes a conduit for transmitting these various requests with CoD fields attached from any component to the next. In the preferred embodiment, no acknowledgement is sent if the L2 cache results in a miss, although the present invention does foresee that an ACK signal 306 can be architected on system bus if desired and instruction retrieved from an external location.

Figure 5:
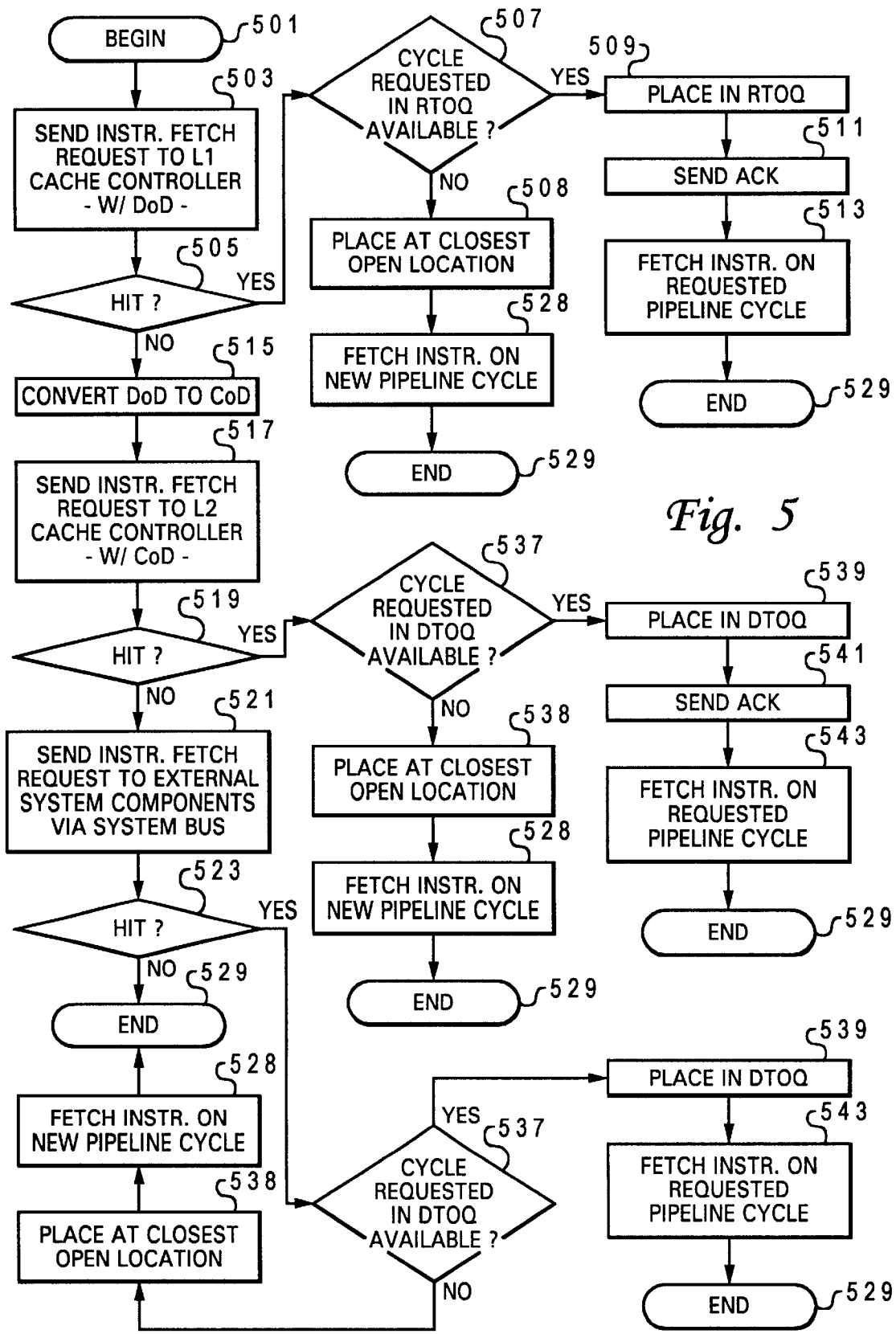
FIG. 5 depicts a logic flow chart of the process of fetching instructions with a IFR containing a TDF in accordance with a preferred embodiment of the present invention.

Turning now to FIG. 5, there is illustrated a logical flowchart of the process of fetching instruction utilizing an IFR with appended ToD field. The process begins at step 501. An instruction fetch request is sent to L1 cache controller with an appended ToD field (step 503). The L1 cache controller searches its directory to determine if a hit (step 505). If a hit, then the L1 cache controller checks its RTOQ to see if the requested cycle is available (step 507). If it is not available, then the IFR is placed at the closest available location within the RTOQ (step 508) and the instruction is sent on a different cycle (step 528). The process then ends (step 529). If, the cycle is available, the IFR is placed in the queue at that location (step 509). An acknowledgement signal is sent to the instruction processor (step 511). The instruction is loaded at the requested pipeline cycle (step 513), then the process ends (step 529).

Returning now to the determination of a hit (step 505). When there is no hit (i.e. a miss occurs), the ToD is converted to a CoD (step 515) as described above. The IFR is sent to the L2 cache controller with the appended CoD (step 517). L2 cache controller searches its directory to determine if a hit (step 519). If a hit, then the L2 cache controller checks its DTOQ to see if the DST cycle in the DTOQ is available (step 537). If it is not available, then the IFR is placed at the closest available location within the DTOQ (step 538) and the instruction is sent on a different cycle (step 528). The process then ends (step 529). If the DST cycle is available, the IFR is placed in the DTOQ at that location (step 539). An acknowledgement signal is sent to the processor (step 541). The instruction is loaded on the requested DST cycle (step 543), then the process ends (step 529). If not a hit, then the IFR is sent to the external system components via the system bus (step 521). The IFR snoops the directory structures of these external component to determine it a hit (step 523). If a hit, and the system component has a time order queue, the system determines if the cycle requested in the time-ordered queue is available (step 537). If it is available, the IFR is placed in the queue (step 539) and the instruction loaded on the requested DST cycle (step 543). Then the process ends (step 529). If it is not available, however, the IFR is placed at the closest available location (step 538) and the instruction fetched on that cycle (step 528). Then the process ends (Step 529). The process also ends (step 529) when no hit occurs at the external system components.

Those skilled in the art will appreciate that a variety of process steps are possible when snooping external system components and that only one is presented herein for simplicity and brevity. For example, no limit exists on the levels of caches available to a processor. The invention is easily extended to cover processors with level 3 (L3), level 4 (L4) and other lower level caches. Also, although FIG. 5 illustrates numerous steps in a sequential fashion for the sake of simplicity, those skilled in the art will appreciate that many of the operations to which the steps pertain may actually be performed in parallel or in a different order.

MULTIPLE TDF METHOD

In the multiple TDF embodiment, the second TDF field is referred to as Alternate Preferred Time (APT) and the third TDF field the range of dependency (RoD). The first TDF (ToD or CoD) is the desired time dependency. However, during processing, the requested TDF may have a conflict with other cache resources. Thus APT may then be utilized to select an alternate TDF clock cycle. This APT may be a neighboring cycle (i.e., 1 cycle away) or many cycles away from the desired time dependency. In the preferred embodiment, the APT is the same cycle on the next natural loop of the processor pipeline. The utilization of multiple TDF fields may also include a third TDF field which provides a range of dependency (RoD). RoD refers to a number of cycles before or after the desired cycle (for example, a desired cycle of cycle 50, with a range of 5 cycles allows the instruction to be fetched anytime between cycle 45 and cycle 55). In the preferred embodiment, the RoD is equally spread around CoD or ToD, however, it is contemplated that the range may be skewed. The invention may allow for a skewed range. In the above example, for instance, instruction may be loaded anytime between cycle 48 and 57, or 43 and 52 when the range is 10. Those skilled in the art understand the concept of a skewed range to increase processor efficiency.

During ToD to CoD conversion, the original APT (and RoD) values are also adjusted to reflect corresponding cycles based on the DST time. Skewing the range may be required to enable greater efficiency in providing instruction to a process which may prefer the instruction earlier or later when the desired time is not available. The RoD, when utilized as a raw number (range of 10) around the desired time is not adjusted during ToD to CoD conversion.

Figure 7:
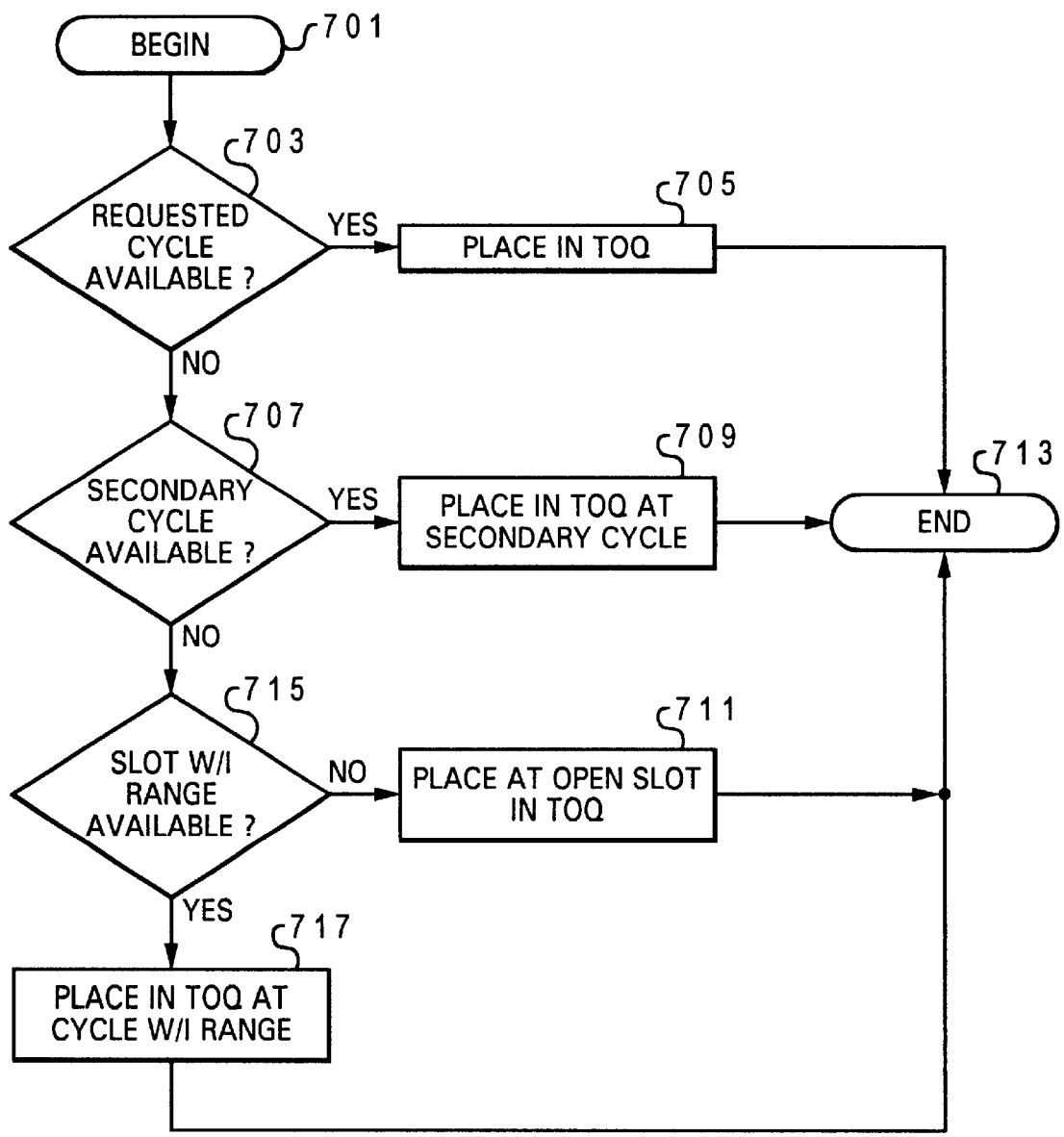
FIG. 7 depicts a flowchart of processing a multiple TDF IFR in accordance with a preferred embodiment of the present invention.

FIG. 7 depicts the process of ordering IFRs of FIG. 5 during multiple TDF implementation. The process begins (step 701) when the time ordered queue is checked for the availability of the requested cycle (i.e., the ToD or CoD) (step 703). If the cycle is available, the IFR is placed in time ordered queue at the requested cycle (ToD or CoD) (step 705). If, however, the cycle is unavailable, the process then checks for the availability of the Alternate Preferred Time (APT) cycle (step 707). If the APT cycle is available, the IFR is placed in the time ordered queue at that cycle (step 709). If, the APT cycle is unavailable, another check is made for the availability of a cycle within a range of dependencies (RoD) (step 715). If available, the IFR is placed in the time ordered queue at a cycle time ordered queue within the range of dependency (RoD) (step 717). If, however, no cycle is available within the RoD, the IFR is placed at an open/cycle within time ordered queue (step 711). Once the IFR is placed in the time ordered queue, the process ends (step 713). Although not shown, those skilled in the art appreciated that many other process steps are possible in attempting to place the IPR within the time ordered queue. Once all pre-defined steps have been completed, however, the instruction is placed at a random location which is available.

The process of sending an ACK is extended to the multiple TDF embodiment. A different ACK is sent for each TDF. Each ACK is coded to allow the system resources to decipher which TDF is actually being acknowledged. In this embodiment, the corresponding ACK is sent and the system resources reserve pipeline based on the TDF. The RoD allows the system resources to determine if an available pipeline bubble exists within that range and to allocate that bubble to the IFR.

As a final matter, it is important that while an illustrative embodiment of the present invention has been, and will continue to be, described in the context of a fully functional instruction processing system, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While an illustrative embodiment has been particularly shown and described, it will be understood by those skilled in the art that various changes in form and detail may be made therein without departing from the spirit and scope of the illustrative embodiment.

What is claimed is:

1. A method of delivering instructions in a preferred order to execution units in a data processing system that issues requests for instructions many cycles ahead of their execution, comprising the steps of:
   determining a time of dependency (ToD) for each instruction subject to successive instruction fetch requests, the ToD representing a time interval between issuance of an instruction fetch requests (IFR) and utilization of a respectively fetched instruction by execution units of a processor of said data processing system; and
   issuing instruction fetch requests (IFRs) to fetch instructions into an execution pipeline of the execution units in an order conforming to the ToD, wherein said order allows a fetched instruction to be received at said pipeline only at a time said fetched instruction is actually required for processing.

2. The method of claim 1, said determining step further comprising the step of appending a ToD value to said IFR.

3. The method of claim 2, wherein said processor has a non-blocking, fixed-delay path from an instruction cache storing said instruction, and said appending step includes the step of calculating said ToD value with an offset corresponding to a number of cycles required for said fetched instruction to travel along said non-blocking, fixed-delay path.

4. The method of claim 3, further comprising the steps of:
   loading said instruction from a processor cache at said ToD when said IFR hits at said processor cache;
   when said IFR misses at said processor cache, snooping said IFR at a lower level cache for a hit; and
   sending an acknowledgement (ACK) signal back to said processor when said instruction is stored within said instruction cache, wherein said processor utilizes said ACK signal and known processing cycles and dependencies to calculate future values of said ToD for other IFRs.

5. The method of claim 1, wherein said issuing step includes the steps of:
   searching a directory of said internal cache for said required instruction;
   when said searching step results in a hit, checking a time ordered queue of a cache controller associated with said directory for an available cycle slot corresponding to said ToD; and
   placing said IFR in said available cycle slot when it is available, wherein said IFR is issued from said time ordered queue at a time and order determined by said cycle slot in which said IFR is placed.

6. The method of claim 5, wherein when said searching step results in a miss, said loading step further includes the steps of:
   converting said ToD to a cycle of dependency(CoD);
   snooping a lower level cache with said converted IFR along with an associated CoD;
   loading said requested instruction from said lower level cache at a time specified by said CoD when said snooping step results in a hit and a CoD time slot is available in a time ordered queue of said lower level cache.

7. The method of claim 6, further comprising the steps of:
   adding a ToD value from a ToD field of N bits to said present time to yield a resulting time; and
   generating said CoD by appending a carry over of said adding step to said resulting time, wherein said carry over signals a user of said CoD to wait until a successive period before placing said load instruction in a time-ordered queue at a cycle slot corresponding to said CoD.

8. The method of claim 7, further comprising:
   tracking a simulated ST for said data processing system, wherein said ST has a current time measured in cycles and a period and said ST has alternating even and odd periods; and
   said generating step includes the steps of:
     appending said even/odd bit to said N bits of said resulting time; and
     storing a value corresponding to said period in said even/odd bit.

9. A system of delivering instructions in a preferred order to execution units in a data processing system to enable just-in-time delivery of requested instructions, said system comprising:

means for determining a time of dependency (ToD) for each instruction subject to successive instruction fetch requests, the ToD representing a time interval between issuance of an instruction fetch requests (IFR) and utilization of a respectively fetched instruction by execution units of a processor of said data processing system; and means for issuing instruction fetch requests to fetch instructions into an execution pipeline of the execution units in an order conforming to the ToD, wherein said order allows a fetched instruction to be received at said pipeline only at a time said fetched instruction is actually required for processing.

10. The system of claim 9, said determining means further comprising means for appending a ToD value to said IFR.

11. The system of claim 10, wherein said processor has a non-blocking, fixed-delay path from an instruction cache storing said instruction, and said appending means includes means for calculating said ToD value with an offset corresponding to a number of cycles required for said fetched instruction to travel along said non-blocking, fixed-delay path.

12. The system of claim 9 wherein said distance of dependency in said determining means is a number of cycles between the dispatching of said IFR by said processor and a time at which the requested instruction is required during execution of a program, wherein said time is an absolute time, and said issuing means further includes means for loading said instruction at said absolute time.

13. The system of claim 9, wherein said loading means includes:

means for searching a directory of an internal processor cache for said instruction;

means for checking an ordered queue of a cache controller associated with said directory for an available cycle slot corresponding to said number of cycles, when said searching results in a hit; and means for placing said IFR in said available cycle slot when it is available.

14. The system of claim 12, further comprising:

means for loading said instruction from a processor cache at said ToD when said IFR hits at said processor cache;

means, when said IFR misses at said processor cache, for snooping said IFR at a lower level cache for a hit; and means for sending an acknowledgment signal back to said processor when said instruction is stored within said instruction cache, wherein said processor utilizes said ACK signal and known processing cycles and dependencies to calculate future values of said ToD for other IFRs.

15. The system of claim 13, wherein when said searching results in a miss, said loading means further includes:

means for converting said ToD to a cycle of dependency (CoD); and means for loading said requested data from said lower level cache at a time corresponding to said CoD, when said snooping step results in a hit.

16. The system of claim 15, further comprising:

means for adding a ToD value from a ToD field of N bits to said present time to yield a resulting time; and means for generating a CoD by appending a carry over of said adding step to said resulting time, wherein said carry over signals a user of said CoD to wait until a successive period before placing said load instruction in a time-ordered queue at a cycle slot corresponding to said CoD.

17. The system of claim 16, further comprising:

means for tracking a simulated ST for said data processing system, wherein said ST has a current time measured in cycles and a period and said ST has alternating even and odd periods; and said generating means includes:

means for appending said even/odd bit to said N bits of said resulting time; and means for storing a value corresponding to said period in said even/odd bit.

18. A data processing system for enabling just in time delivery of instruction fetch requests to a data cache, said data processing system comprising:

a processor;

an instruction cache;

means for appending a priority field to an instruction fetch request (IFR), said priority field holding a time of dependency (ToD) value, wherein said time of dependency corresponds to a number of cycles between issuance of an IFR from an instruction sequencing unit and a time a corresponding fetched instruction is actually needed for execution by an execution unit of said processor;

means for ordering a placement and subsequent issuance of said IFR in a time-ordered queue of an instruction cache based on said ToD;

means for issuing said IFR from said time-ordered queue to said instruction cache at said order to allow a corresponding instruction to be fetched at a time it is actually needed by an execution unit.

19. The data processing system of claim 18, wherein said appending means is a implemented as a software algorithm.

20. The data processing system of claim 18, further comprising a plurality of system components and bus means for interconnecting said system components, wherein said bus means and said plurality of system components support IFRs with appended ToD and CoD fields.

21. The data processing system of claim 18, further comprising acknowledgment means for signaling to a system component that said instructions fetched by said load instruction will be delivered at said time in response to said instruction being present in said instruction cache and said time being available in said time-ordered queue.

* * * * *

UNITED STATES PATENT AND TRADEMARK OFFICE
CERTIFICATE OF CORRECTION

PATENT NO.     : 6,427,204 B1
DATED          : July 30, 2002
INVENTOR(S)    : Ravi Kumar Arimilli et al.

It is certified that error appears in the above-identified patent and that said Letters Patent is hereby corrected as shown below:

<u>Title page,</u>
Item [75], Inventors, please change "Lakshminarayanan" to
-- Lakshminarayana --.

Signed and Sealed this

Fourth Day of February, 2003

JAMES E. ROGAN
*Director of the United States Patent and Trademark Office*